United States Patent
Dong et al.

(10) Patent No.: US 11,830,244 B2
(45) Date of Patent: Nov. 28, 2023

(54) IMAGE RECOGNITION METHOD AND APPARATUS BASED ON SYSTOLIC ARRAY, AND MEDIUM

(71) Applicant: Inspur Suzhou Intelligent Technology Co., Ltd., Suzhou (CN)

(72) Inventors: Gang Dong, Suzhou (CN); Yaqian Zhao, Suzhou (CN); Rengang Li, Suzhou (CN); Hongbin Yang, Suzhou (CN); Haiwei Liu, Suzhou (CN); Dongdong Jiang, Suzhou (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/034,013

(22) PCT Filed: Apr. 26, 2021

(86) PCT No.: PCT/CN2021/089863
§ 371 (c)(1),
(2) Date: Apr. 26, 2023

(87) PCT Pub. No.: WO2022/088629
PCT Pub. Date: May 5, 2022

(65) Prior Publication Data
US 2023/0326199 A1    Oct. 12, 2023

(30) Foreign Application Priority Data
Oct. 27, 2020   (CN) .......................... 202011163647.8

(51) Int. Cl.
*G06V 10/764*    (2022.01)
*G06V 10/94*    (2022.01)
(Continued)

(52) U.S. Cl.
CPC .......... *G06V 10/955* (2022.01); *G06V 10/751* (2022.01); *G06V 10/764* (2022.01); *G06V 10/7715* (2022.01)

(58) Field of Classification Search
CPC ............. G06V 10/7715; G06V 10/751; G06V 10/764; G06V 10/955
See application file for complete search history.

(56) References Cited

U.S. PATENT DOCUMENTS

| 5,138,695 A | * | 8/1992 | Means | ...................... G06T 5/20 |
| | | | | 706/41 |
| 6,542,987 B1 | * | 4/2003 | Fischer | ................... G06F 9/384 |
| | | | | 714/21 |

(Continued)

FOREIGN PATENT DOCUMENTS

| CN | 106156807 | 11/2016 |
| CN | 109829481 | 5/2019 |

(Continued)

OTHER PUBLICATIONS

Anand Kumar Mukhopadhyay et al. "Systematic realization of a fully connected deep and convolutional neural network architecture on a field programmable gate array"; Elsevier; 2022 (Year: 2022).*

(Continued)

*Primary Examiner* — Shaghayegh Azima
(74) *Attorney, Agent, or Firm* — Crowell & Moring LLP

(57) ABSTRACT

An image recognition method and apparatus based on a systolic array, and a medium are disclosed. The method includes: converting obtained image feature information into a one-dimensional feature vector; converting an obtained weight matrix into a one-dimensional weight vector, and allocating a corresponding weight group to each node in a trained three-dimensional systolic array model; performing multiply-accumulate of the feature vector and a weight value on the one-dimensional feature vector in (Continued)

parallel by using the three-dimensional systolic array model, to obtain a feature value corresponding to each node, the feature values with different values reflecting article categories contained in an image; and determining an article category contained in the image according to the feature value corresponding to each node and a pre-established corresponding relationship between the feature value and the article category.

20 Claims, 2 Drawing Sheets

(51) Int. Cl.
  *G06V 10/75* (2022.01)
  *G06V 10/77* (2022.01)

(56) References Cited

U.S. PATENT DOCUMENTS

2019/0188530 A1* 6/2019 Hu .................. G06F 18/217
2022/0342824 A1* 10/2022 Liu .................. G06F 12/0897

FOREIGN PATENT DOCUMENTS

| | | |
|---|---|---|
| CN | 110084244 | 8/2019 |
| CN | 110503160 | 11/2019 |
| CN | 111402217 | 7/2020 |
| CN | 111723906 | 9/2020 |
| CN | 111723906 A * | 9/2020 |
| CN | 112085128 | 12/2020 |
| EP | 3626163 | 3/2020 |

OTHER PUBLICATIONS

International Search Report and Written Opinion of corresponding PCT application No. PCT/CN2021/089863 dated Jul. 28, 2021, including translations (13 pages).

Search report of corresponding CN priority application (CN202011163647.8) dated Apr. 23, 2022 (2 pages).

Can Jiang, "An Acceleration Structure of Convolutional Neural Network", (China Master's Theses Full-text Database, Information Technology, 2020) ,No. 7, Jul. 31, 2020,ISSN:1674-0246, pp. 24-38, 48-59 with English abstract (79 pages).

* cited by examiner

IMAGE RECOGNITION METHOD AND APPARATUS BASED ON SYSTOLIC ARRAY, AND MEDIUM

This application is the national phase application of International Application No. PCT/CN2021/089863, filed Apr. 26, 2021, which claims priority to Chinese Patent Application No. 202011163647.8, filed on Oct. 27, 2020 in China National Intellectual Property Administration and entitled "IMAGE RECOGNITION METHOD AND APPARATUS BASED ON SYSTOLIC ARRAY, AND MEDIUM", the entire contents of each of which are incorporated herein by reference.

FIELD

The present disclosure relates to the field of image processing technologies, and particularly relates to an image recognition method and apparatus based on a systolic array, and a computer-readable storage medium.

BACKGROUND

At present, researches on deep learning mainly focuses on Convolutional Neural Networks (CNNs). Due to different processing scenarios, requirements for the performance of a CNN are also different, resulting in the development of various kinds of network structures. However, basic compositions of a CNN are fixed, including an input layer, a convolutional layer, an activation layer, a pooling layer, and a fully connected layer.

The fully connected layer functions as a "classifier" in the entire convolutional neural network. Operations such as the convolutional layer, the pooling layer and the activation layer are to map original data to a hidden layer feature space, the fully connected layer plays a role of mapping a learned "distributed feature representation" to a sample labeling space. In practical use, the fully connected layer might be implemented by a convolution operation. In a CNN, full connection often appears in the last few layers and is used for performing weighted summation on previously designed features. The early convolution and pooling are equivalent to feature processing, and the later full connection is equivalent to feature weighting.

At present, there are two main methods for calculating a fully connected layer. One method is to calculate the fully connected layer on the basis of a convolution with a convolution kernel size of 1*1. However, a convolution core, namely, data of a weight value needs to be quickly replaced, resulting in a significant bandwidth load for data transmission. The second method is a method of parallel calculation by using all or part of elements corresponding to feature values and weight values. Due to the parallel calculation, an additional intermediate result processing step is required, so continuous calculation cannot be performed, which reduces the utilization efficiency of hardware resources, and affects the efficiency of image classification processing.

It might be seen that how to improve the efficiency of image classification processing is a problem that needs to be solved by those skilled in the art.

SUMMARY

Embodiments of the present disclosure aim to provide an image recognition method and apparatus based on a systolic array, and a computer-readable storage medium, which might improve the efficiency of image classification processing.

In order to solve the above technical problems, the embodiments of the present disclosure provide an image recognition method based on a systolic array, including:
converting obtained image feature information into a one-dimensional feature vector;
converting an obtained weight matrix into a one-dimensional weight vector, and allocating a corresponding weight group to each node in a trained three-dimensional systolic array model;
performing multiply-accumulate of a feature vector and a weight value on the one-dimensional feature vector in parallel by using the three-dimensional systolic array model, to obtain a feature value corresponding to each node; and
determining an article category contained in the image according to the feature value corresponding to each node and a pre-established corresponding relationship between the feature value and the article category.

In some embodiments, the performing multiply-accumulate of a feature vector and a weight value on the one-dimensional feature vector in parallel by using the three-dimensional systolic array model, to obtain a feature value corresponding to each node includes:
performing multiply-accumulate on the one-dimensional feature vector and a current feature value of a first node in the three-dimensional systolic array model, and adopting an obtained multiply-accumulate value as the feature value of the first node;
transmitting, according to a node transmission direction of the three-dimensional systolic array model, the one-dimensional feature vector respectively to at least three second nodes that are directly connected to the first node; and
performing multiply-accumulate on the one-dimensional feature vector and the current feature value of each of the second nodes separately, and adopting an obtained multiply-accumulate value as the feature value separately corresponding to each of the second nodes; and adopting each of the second node as the first node, and returning to the step of performing multiply-accumulate on the one-dimensional feature vector and a current feature value of a first node in the three-dimensional systolic array model, and adopting an obtained multiply-accumulate value as the feature value of the first node, until calculation of feature values of all nodes in the three-dimensional systolic array model is completed.

In some embodiments, after the performing multiply-accumulate of a feature vector and a weight value on the one-dimensional feature vector in parallel by using the three-dimensional systolic array model, to obtain a feature value corresponding to each node, the method further includes:
judging whether a number of currently obtained feature values reaches an output number corresponding to the image feature information;
if the number of currently obtained feature values does not reach the output number corresponding to the image feature information, adopting a next weight value adjacent to a current weight value in the weight group of each node in the three-dimensional systolic array model as a latest current weight value of each node, and returning to the step of performing multiply-accumulate on the one-dimensional feature vector and a current feature value of a first node in the three-dimensional systolic array model, and adopting an obtained multiply-accumulate value as the feature value of the first node; and if the number of currently obtained feature values reaches the output number corresponding to the image feature information, executing the step of determining an article category contained in the image according to the feature value corresponding to each node and a pre-established corresponding relationship between the feature value and the article category.

In some embodiments, the determining an article category contained in the image according to the feature value corresponding to each node and a pre-established corresponding relationship between the feature value and the article category includes:

calculating a cumulative sum value of feature values of all nodes according to the feature values corresponding to each node;

calculating a ratio of the feature value corresponding to each node to the cumulative sum value, and selecting a node with the ratio satisfying a preset condition as a target node; and querying the pre-established corresponding relationship between the feature value and the article category, to determine the article category that matches the feature value of the target node.

In some embodiments, the selecting a node with the ratio satisfying a preset condition as a target node includes:

selecting a node with the largest ratio as the target node.

In some embodiments, before the allocating a corresponding weight group to each node in a trained three-dimensional systolic array model, the method further includes:

adjusting a number of channels of the three-dimensional systolic array model according to an output number corresponding to the image feature information.

The embodiments of the present disclosure further provide an image recognition apparatus based on a systolic array, including: a conversion unit, an allocation unit, a multiply-accumulate unit and a determining unit, the conversion unit being configured for converting obtained image feature information into a one-dimensional feature vector;

the allocation unit being configured for: converting an obtained weight matrix into a one-dimensional weight vector, and allocating a corresponding weight group to each node in a trained three-dimensional systolic array model;

the multiply-accumulate unit being configured for performing multiply-accumulate of a feature vector and a weight value on the one-dimensional feature vector in parallel by using the three-dimensional systolic array model, to obtain a feature value corresponding to each node; and the determining unit, configured for determining an article category contained in the image according to the feature value corresponding to each node and a pre-established corresponding relationship between the feature value and the article category.

In some embodiments, the multiply-accumulate unit includes a first calculation subunit, a transmission subunit, a second calculation subunit and an adoption subunit;

the first calculation subunit is configured for performing multiply-accumulate on the one-dimensional feature vector and a current feature value of a first node in the three-dimensional systolic array model, and adopting an obtained multiply-accumulate value as the feature value of the first node;

the transmission subunit is configured for transmitting, according to a node transmission direction of the three-dimensional systolic array model, the one-dimensional feature vector respectively to at least three second nodes that are directly connected to the first node;

the second calculation subunit is configured for performing multiply-accumulate on the one-dimensional feature vector and current feature values of the various second nodes separately, and adopting obtained multiply-accumulate values as the feature values separately corresponding to the various second nodes; and the adoption subunit is configured for adopting each second node as the first node, and returning to the step of performing multiply-accumulate on the one-dimensional feature vector and a current feature value of a first node in the three-dimensional systolic array model, and adopting an obtained multiply-accumulate value as the feature value of the first node, until calculation of the feature values of all the nodes in the three-dimensional systolic array model is completed.

In some embodiments, the apparatus further includes a judgment unit and an adoption unit;

the judgment unit is configured for judging whether the number of currently obtained feature values reaches an output number corresponding to the image feature information; if the number of currently obtained feature values reaches the output number corresponding to the image feature information, triggering the determining unit; and if the number of currently obtained feature values does not reach the output number corresponding to the image feature information, triggering the adoption subunit; and the adoption unit is configured for adopting a next weight value adjacent to a current weight value in the weight group of each node in the three-dimensional systolic array model as a latest current weight value of each node, and returning to the first calculation subunit.

In some embodiments, the determining unit includes a calculation subunit, a selection subunit and a query subunit;

the calculation subunit is configured for calculating a cumulative sum value of the feature values of all the nodes according to the feature values corresponding to the various nodes;

the selection subunit is configured for: calculating ratios of the feature values corresponding to the various nodes to the cumulative sum value, and selecting a node with the ratio satisfying a preset condition as a target node; and the query subunit is configured for querying the pre-established corresponding relationship between the feature value and the article category, to determine the article category that matches the feature value of the target node.

In some embodiments, the selection subunit is in some embodiments configured for selecting a node with the largest ratio as the target node.

In some embodiments, the apparatus further includes an adjustment unit; and the adjustment unit is configured for adjusting the number of channels of the three-dimensional systolic array model according to the output number corresponding to the image feature information.

The embodiments of the present disclosure further provide an image recognition apparatus based on a systolic array, including:
- a memory, configured for storing a computer program; and
- a processor, configured for executing the computer program to implement the steps of any of the above image recognition method based on a systolic array.

The embodiments of the present disclosure further provide a computer-readable storage medium. The computer-readable storage medium stores a computer program. The computer program, when executed by a processor, implements the steps of any of the above image recognition method based on a systolic array.

It might be seen from the above technical solutions that the obtained image feature information is converted into the one-dimensional feature vector; the obtained weight matrix is converted into the one-dimensional weight vector; and a corresponding weight group is allocated to each node in the trained three-dimensional systolic array model. The complexity of carrying out calculation on the image feature information subsequently might be effectively reduced by converting the image feature information into the one-dimensional feature vector. The multiply-accumulate of the feature vector and a weight value is performed on the one-dimensional feature vector in parallel by using the three-dimensional systolic array model, to obtain the feature value corresponding to each node. The feature values with different values might reflect article categories contained in an image. The article category contained in the image is determined according to the feature value corresponding to each node and the pre-established corresponding relationship between the feature value and the article category. In this technical solution, after one-dimensional conversion is carried out on the image feature information to be calculated and the weight value, the one-dimensional feature vector is calculated by adopting a framework of carrying out accelerated calculation with the systolic array model, whereby a parallelism degree of vector calculation is fully expanded, the calculation time of a fully connected layer is shortened, and the efficiency of image classification processing is effectively improved.

BRIEF DESCRIPTION OF THE DRAWINGS

In order to explain the embodiments of the present disclosure more clearly, the following will briefly introduce the accompanying drawings used in the embodiments. Apparently, the drawings in the following description are only some embodiments of the present disclosure. Those of ordinary skill in the art might obtain other drawings based on these drawings without creative work.

DETAILED DESCRIPTION

The following clearly and completely describes the technical solution in the embodiments of the present disclosure in combination with the accompanying drawings of the embodiments of the present disclosure. Apparently, the described embodiments are only part of the embodiments of the present disclosure, not all embodiments. Based on the embodiments in the present disclosure, all other embodiments obtained by those of ordinary skill in the art without creative work shall fall within the protection scope of the present disclosure.

In order to make those skilled in the art better understand the solutions of the present disclosure, the present disclosure is further described in detail below with reference to the accompanying drawings and specific implementation modes.

Figure 1:
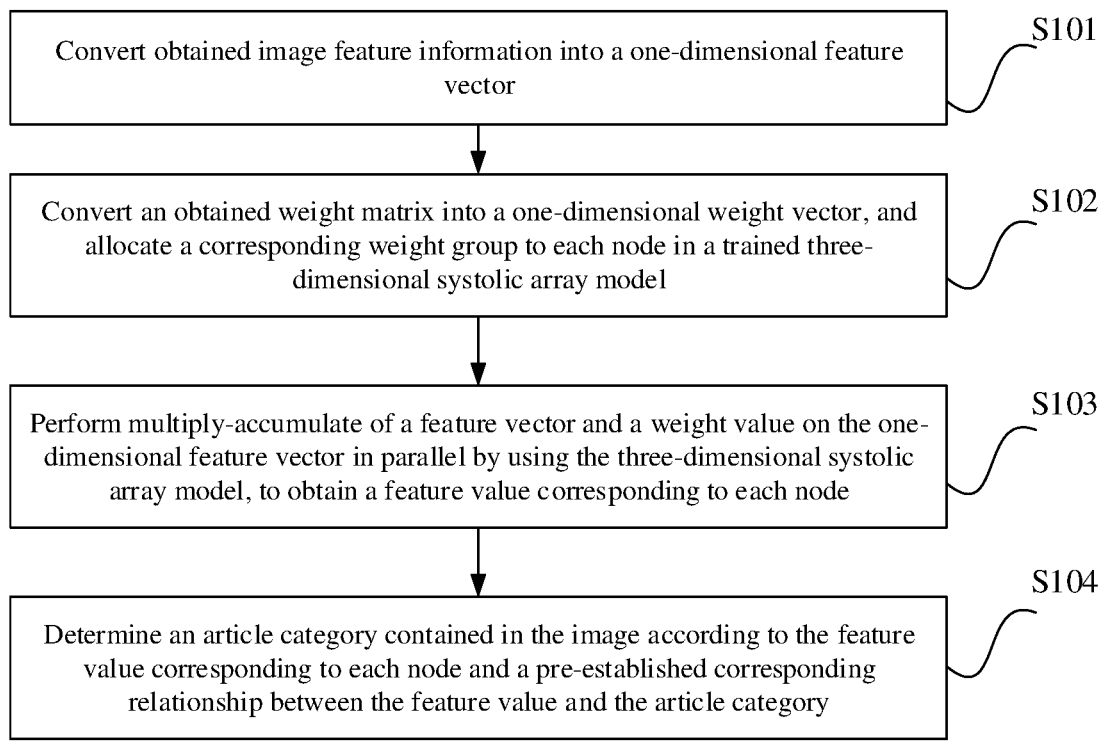
FIG. 1 is a flowchart of an image recognition method based on a systolic array according to an embodiment of the present disclosure.

Next, an image recognition method based on a systolic array provided in an embodiment of the present disclosure will be described in detail. FIG. 1 is a flowchart of an image recognition method based on a systolic array according to an embodiment of the present disclosure. The method includes:

S101: converting obtained image feature information into a one-dimensional feature vector.

In this embodiment of the present disclosure, the image feature information may be converted into the one-dimensional feature vector according to a definition of calculation of a fully connected layer in a neural network.

S102: converting an obtained weight matrix into a one-dimensional weight vector, and allocating a corresponding weight group to each node in a trained three-dimensional systolic array model.

The weight matrix may be converted into the one-dimensional weight vector according to the same order as that of the image feature information. The number of weight values contained in the weight vector is equal to a product of the number of input channels in the neural network and the number of output channels in the neural network.

Figure 2:
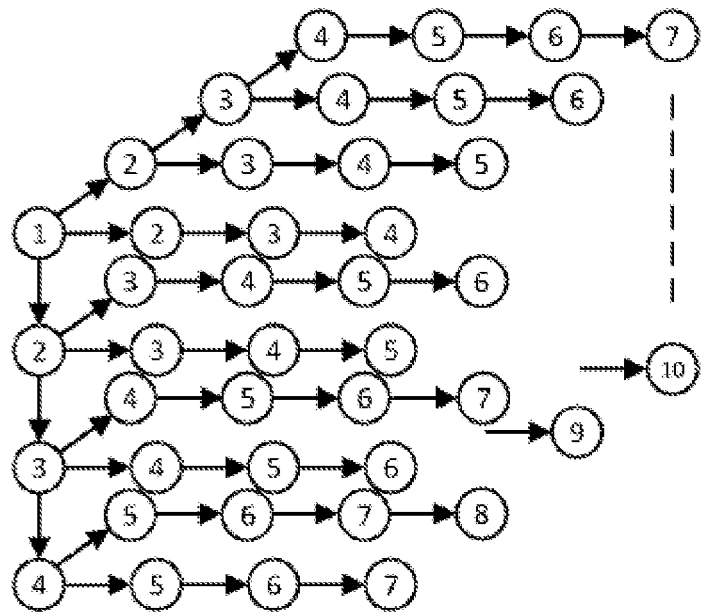
FIG. 2 is a schematic structural diagram of a three-dimensional systolic array model according to an embodiment of the present disclosure.

FIG. 2 shows a schematic structural diagram of a three-dimensional systolic array model according to an embodiment of the present disclosure. In practical applications, corresponding weight values might be allocated to various nodes in the three-dimensional systolic array model in sequence according to a scale of the three-dimensional systolic array model. Each node often corresponds to a plurality of weight values, and the plurality of weight values corresponding to each node may be referred to as a weight group. In FIG. 2, nodes contained in each layer are represented by digits. It might be seen from FIG. 2 that node 1 corresponds to three nodes 2 in total along three node transmission directions. Three nodes 2 corresponds to six nodes 3 in total along node transmission directions.

S103: performing multiply-accumulate of the feature vector and a weight value on the one-dimensional feature vector in parallel by using the three-dimensional systolic array model, to obtain a feature value corresponding to each node.

Considering that the scale of the three-dimensional systolic array model is limited, the number of feature values obtained by inputting the one-dimensional feature vector to the three-dimensional systolic array model for one operation may not satisfy the output number that is actually required by the image feature information. Therefore, after the one operation is completed, it is necessary to input the one-dimensional feature vector to the three-dimensional systolic array model again for operation. At this point, the weight values of the various nodes in the operating three-dimensional systolic array model will change.

Each node has its corresponding weight group. During first operation, a first weight value in the weight group of each node might be adopted as a current weight value. During second operation, a second weight value in the weight group of each node might be adopted as a current weight value, and so on. During each operation, the weight value of each node is different from the weight value during the last operation.

In specific implementation, it may include: performing multiply-accumulate on the one-dimensional feature vector and a current feature value of a first node in the three-dimensional systolic array model, and adopting an obtained multiply-accumulate value as the feature value of the first node; transmitting, according to a node transmission direction of the three-dimensional systolic array model, the one-dimensional feature vector respectively to at least three second nodes that are directly connected to the first node; performing multiply-accumulate on the one-dimensional feature vector and current feature values of the various second nodes separately, and adopting obtained multiply-accumulate values as the feature values separately corresponding to the various second nodes; and adopting each second node as the first node, and returning to the step of performing multiply-accumulate on the one-dimensional feature vector and a current feature value of a first node in the three-dimensional systolic array model, and adopting an obtained multiply-accumulate value as the feature value of the first node, and so on, until calculation of the feature values of all the nodes in the three-dimensional systolic array model is completed.

The multiply-accumulate refers to multiplying the various feature values contained in the one-dimensional feature vector by the weight value, and then summing all products to obtain the multiply-accumulate value.

When the calculation of the feature values of all the nodes in the three-dimensional systolic array model is completed, one operation for the one-dimensional feature vector is completed. In practical applications, the scale of the three-dimensional systolic array model might be set according to the number of feature values required to recognize an article category. When the scale of the three-dimensional systolic array model matches the number of feature values required to recognize an article category in the image, S104 might be executed after the calculation of the feature values of all the nodes in the three-dimensional systolic array model is completed.

S104: determining an article category contained in the image according to the feature value corresponding to each node and a pre-established corresponding relationship between the feature value and the article category.

In this embodiment of the present disclosure, a feature value is used to represent a category of an article. Different values of the feature values reflect different article categories corresponding to the feature values. There may be multiple article categories contained in one image, for example, pedestrians, vehicles and shops. In this embodiment of the present disclosure, the corresponding relationship between the feature values and the article categories might be pre-established.

After the feature value corresponding to each node is obtained, a cumulative sum value of the feature values of all the nodes might be calculated according to the feature values corresponding to the various nodes; and ratios of the feature values corresponding to the various nodes to the cumulative sum value are then calculated, and a node with the ratio satisfying a preset condition is selected as a target node.

Each node has its corresponding feature value, and the feature value has its corresponding article category. A higher ratio of a node indicates a higher probability that an image contains this article category. In practical applications, a node with the largest ratio might be selected as the target node, or nodes with the top three ratios might be selected as the target nodes. The article category that matches the feature value of the target node might be determined by querying the pre-established corresponding relationship between the feature value and the article category, that is, the article category contained in the image.

The image recognition method based on the systolic array provided in this embodiment of the present disclosure might be applied to hardware structures for artificial intelligence calculation acceleration, for example, to a variety of hardware environments such as a Field Programmable Gate Array (FPGA) or an Application Specific Integrated Circuit (ASIC). When the image recognition method based on the systolic array is applied to the above hardware environments, a parallelism degree of vector calculation might be fully expanded when image classification processing is carried out on the basis of the above hardware device, thereby improving the efficiency of classification processing.

It might be seen from the above technical solutions that the obtained image feature information is converted into the one-dimensional feature vector; the obtained weight matrix is converted into the one-dimensional weight vector; and a corresponding weight group is allocated to each node in the trained three-dimensional systolic array model. The complexity of carrying out calculation on the image feature information subsequently might be effectively reduced by converting the image feature information into the one-dimensional feature vector. The multiply-accumulate of the feature vector and a weight value is performed on the one-dimensional feature vector in parallel by using the three-dimensional systolic array model, to obtain the feature value corresponding to each node. The feature values with different values might reflect article categories contained in an image. The article category contained in the image is determined according to the feature value corresponding to each node and the pre-established corresponding relationship between the feature value and the article category. In this technical solution, after one-dimensional conversion is carried out on the image feature information to be calculated and the weight value, the one-dimensional feature vector is calculated by adopting a framework of carrying out accelerated calculation with the systolic array model, whereby a parallelism degree of vector calculation is fully expanded, the calculation time of a fully connected layer is shortened, and the efficiency of image classification processing is effectively improved.

In order to ensure that the number of the obtained feature values satisfies the number of feature values required to recognize the article category, the three-dimensional systolic array model is then used to perform multiply-accumulate of the feature vector and the weight value on the one-dimensional feature vector in parallel; and after the feature value corresponding to each node is obtained, it might be judged whether the number of currently obtained feature values reaches the output number corresponding to the image feature information.

If the number of currently obtained feature values does not reach the output number corresponding to the image feature information, it is indicated that the one-dimensional feature vector still needs to be operated. At this time, a next weight value adjacent to a current weight value in the weight group of each node in the three-dimensional systolic array model might be adopted as a latest current weight value of each node, and the step of performing multiply-accumulate on the one-dimensional feature vector and a current feature value of a first node in the three-dimensional systolic array model, and adopting an obtained multiply-accumulate value as the feature value of the first node is executed. If the number of currently obtained feature values reaches the output number corresponding to the image feature information, the step of determining an article category contained in the image according to the feature value corresponding to each node and a pre-established corresponding relationship between the feature value and the article category is executed.

In this embodiment of the present disclosure, the scale of the three-dimensional systolic array model is not limited. In practical applications, before the corresponding weight group is allocated to each node in the trained three-dimensional systolic array model, the number of channels of the three-dimensional systolic array model might be adjusted according to the output number corresponding to the image feature information.

The three-dimensional systolic array model shown in FIG. 2 includes 64 channels, which is taken as an example. It is assumed that when the output number corresponding to the current image feature information is 32, the number of the channels of the three-dimensional systolic array model might be decreased to 32. It is assumed that when the output number corresponding to the current image feature information is 128, the number of the channels of the three-dimensional systolic array model might be increased to 128.

Considering that more channels of the three-dimensional systolic array model indicates higher complexity, in order to balance the complexity of the three-dimensional systolic array model and the efficiency of image classification processing, an upper limit might be set for the scale of the three-dimensional systolic array model. For example, the number of the channels of 128 might be adopted as the upper limit for the scale of the three-dimensional systolic array model. Assuming that the output number corresponding to the current image feature information is 256, the number of channels of the three-dimensional systolic array model might be set to be 128. At this time, it is necessary to input the one-dimensional feature vector twice to the three-dimensional systolic array model to carry out operations, thereby obtaining 256 channel output results.

By dynamically adjusting the number of the channels of the three-dimensional systolic array model, the scale of the three-dimensional systolic array model might be more in line with an actual calculation need, thereby effectively improving the calculation performance of the three-dimensional systolic array model.

Figure 3:
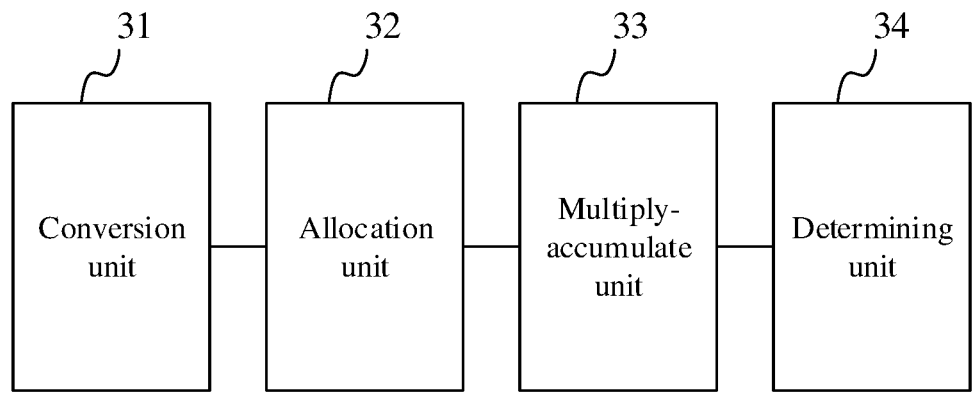
FIG. 3 is schematic structural diagram of an image recognition apparatus based on a systolic array according to an embodiment of the present disclosure.

FIG. 3 shows a schematic structural diagram of an image recognition apparatus based on a systolic array according to an embodiment of the present disclosure, including a conversion unit 31, an allocation unit 32, a multiply-accumulate unit 33 and a determining unit 34.

The conversion unit 31 is configured for converting obtained image feature information into a one-dimensional feature vector.

The allocation unit 32 is configured for: converting an obtained weight matrix into a one-dimensional weight vector, and allocating a corresponding weight group to each node in a trained three-dimensional systolic array model.

The multiply-accumulate unit 33 is configured for performing multiply-accumulate of the feature vector and a weight value on the one-dimensional feature vector in parallel by using the three-dimensional systolic array model, to obtain a feature value corresponding to each node.

The determining unit 34 is configured for determining an article category contained in the image according to the feature value corresponding to each node and a pre-established corresponding relationship between the feature value and the article category.

In some embodiments, the multiply-accumulate unit includes a first calculation subunit, a transmission subunit, a second calculation subunit and an adoption subunit.

The first calculation subunit is configured for performing multiply-accumulate on the one-dimensional feature vector and a current feature value of a first node in the three-dimensional systolic array model, and adopting an obtained multiply-accumulate value as the feature value of the first node.

The transmission subunit is configured for transmitting, according to a node transmission direction of the three-dimensional systolic array model, the one-dimensional feature vector respectively to at least three second nodes that are directly connected to the first node.

The second calculation subunit is configured for: performing multiply-accumulate on the one-dimensional feature vector and current feature values of the various second nodes separately, and adopting obtained multiply-accumulate values as the feature values separately corresponding to the various second nodes.

The adoption subunit is configured for: adopting each second node as the first node, and returning to the step of performing multiply-accumulate on the one-dimensional feature vector and a current feature value of a first node in the three-dimensional systolic array model, and adopting an obtained multiply-accumulate value as the feature value of the first node, until calculation of the feature values of all the nodes in the three-dimensional systolic array model is completed.

In some embodiments, the apparatus further includes a judgment unit and an adoption unit.

The judgment unit is configured for: judging whether the number of currently obtained feature values reaches an output number corresponding to the image feature information; if the number of currently obtained feature values reaches the output number corresponding to the image feature information, triggering the determining unit; and if the number of currently obtained feature values does not reach the output number corresponding to the image feature information, triggering the adoption subunit.

The adoption unit is configured for: adopting a next weight value adjacent to a current weight value in the weight group of each node in the three-dimensional systolic array model as a latest current weight value of each node, and returning to the first calculation subunit.

In some embodiments, the determining unit includes a calculation subunit, a selection subunit and a query subunit.

The calculation subunit is configured for calculating a cumulative sum value of the feature values of all the nodes according to the feature values corresponding to the various nodes.

The selection subunit is configured for: calculating ratios of the feature values corresponding to the various nodes to the cumulative sum value, and selecting a node with the ratio satisfying a preset condition as a target node.

The query subunit is configured for querying the pre-established corresponding relationship between the feature value and the article category, to determine the article category that matches the feature value of the target node.

In some embodiments, the selection subunit is in some embodiments configured for selecting a node with the largest ratio as the target node.

In some embodiments, the apparatus further includes an adjustment unit.

The adjustment unit is configured for adjusting the number of channels of the three-dimensional systolic array model according to the output number corresponding to the image feature information.

The description of the features in the embodiment corresponding to FIG. 3 might refer to the related description of the embodiment corresponding to FIG. 1, and will not be repeated here.

It might be seen from the above technical solutions that the obtained image feature information is converted into the one-dimensional feature vector; the obtained weight matrix is converted into the one-dimensional weight vector; and a corresponding weight group is allocated to each node in the trained three-dimensional systolic array model. The complexity of carrying out calculation on the image feature information subsequently might be effectively reduced by converting the image feature information into the one-dimensional feature vector. The multiply-accumulate of the feature vector and a weight value is performed on the one-dimensional feature vector in parallel by using the three-dimensional systolic array model, to obtain the feature value corresponding to each node. The feature values with different values might reflect article categories contained in an image. The article category contained in the image is determined according to the feature value corresponding to each node and the pre-established corresponding relationship between the feature value and the article category. In this technical solution, after one-dimensional conversion is carried out on the image feature information to be calculated and the weight value, the one-dimensional feature vector is calculated by adopting a framework of carrying out accelerated calculation with the systolic array model, whereby a parallelism degree of vector calculation is fully expanded, the calculation time of a fully connected layer is shortened, and the efficiency of image classification processing is effectively improved.

Figure 4:
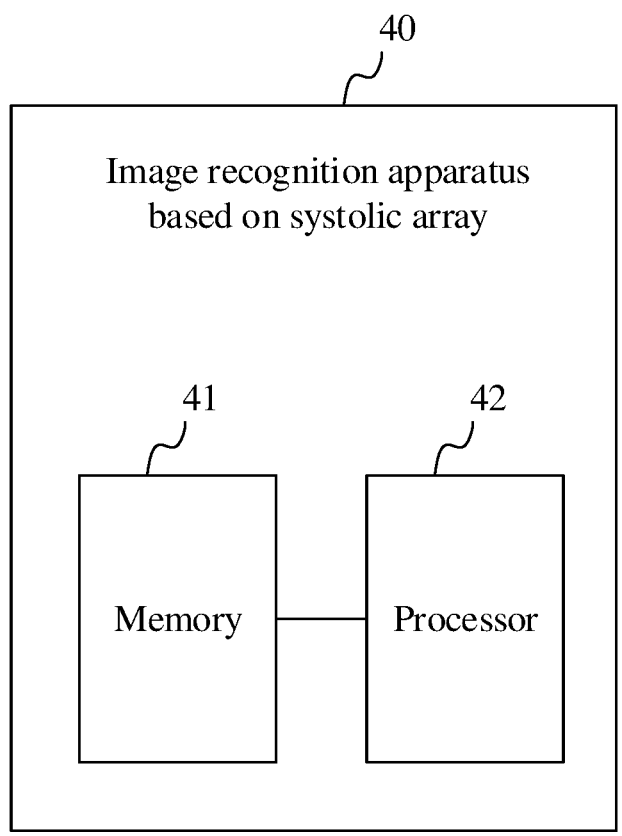
FIG. 4 is a schematic diagram of a hardware structure of an image recognition apparatus based on a systolic array according to an embodiment of the present disclosure.

FIG. 4 is a schematic diagram of a hardware structure of an image recognition apparatus 40 based on a systolic array according to an embodiment of the present disclosure, including:

a memory 41, configured for storing a computer program; and a processor 42, configured for executing the computer program to implement the steps of the image recognition method based on a systolic array in any of the above embodiments.

The embodiments of the present disclosure further provide a computer-readable storage medium. The computer-readable storage medium stores a computer program. The computer program, when executed by a processor, implements the steps of any of the image recognition method based on a systolic array in any of the above embodiments.

The above introduces the image recognition method and apparatus based on a systolic array, and the computer-readable storage medium according to the embodiments of the present disclosure in detail. Some of the embodiments in the specification are described in a progressive manner. Contents mainly described in each embodiment are different from those described in other embodiments. Same or similar parts of Some of the embodiments refer to each other. For the device disclosed in the embodiments, since it corresponds to the method disclosed in the embodiments, the description is relatively simple, and the relevant part might be referred to the description of the method part. It should be pointed out that for those skilled in the art, without departing from the principle of the present disclosure, several improvements and modifications might also be made to the present disclosure, and these improvements and modifications also fall within the protection scope of the claims of the present disclosure.

Professionals might further realize that in connection with the units and algorithm steps of all examples described in the embodiments disclosed herein, they might be implemented by electronic hardware, computer software or a combination of electronic hardware and computer software. In order to clearly describe the interchangeability of hardware and software, the constitutions and steps of all the examples have been generally described according to functions in the above illustration. Whether these functions are executed by hardware or software depends on the specific application and design constraints of the technical solution. Professionals might use different methods for each specific application to implement the described functions, but such implementation should not be considered as going beyond the scope of the present disclosure.

The steps of a method or algorithm described in conjunction with the embodiments disclosed herein may be directly implemented in hardware, a software module executed by a processor, or a combination of the hardware and the software module. The software module might be placed in a random access memory (RAM), an internal memory, a read only memory (ROM), an electrically programmable ROM, an electrically erasable programmable ROM, a register, a hard disk, a mobile disk, a CD-ROM, or any storage medium in other forms known to the technical field.

What is claimed is:

1. An image recognition method based on a systolic array, comprising:

converting obtained image feature information into a one-dimensional feature vector;

converting an obtained weight matrix into a one-dimensional weight vector, and allocating a corresponding weight group to each node in a trained three-dimensional systolic array model;

performing multiply-accumulate of a feature vector and a weight value on the one-dimensional feature vector in parallel by using the three-dimensional systolic array model, to obtain a feature value corresponding to each node; and determining an article category contained in the image according to the feature value corresponding to each node and a pre-established corresponding relationship between the feature value and the article category.

2. The image recognition method based on the systolic array according to claim 1, wherein the performing multiply-accumulate of a feature vector and a weight value on the one-dimensional feature vector in parallel by using the three-dimensional systolic array model, to obtain a feature value corresponding to each node comprises:

performing multiply-accumulate on the one-dimensional feature vector and a current feature value of a first node in the three-dimensional systolic array model, and adopting an obtained multiply-accumulate value as the feature value of the first node;

transmitting, according to a node transmission direction of the three-dimensional systolic array model, the one-dimensional feature vector respectively to at least three second nodes that are directly connected to the first node; and performing multiply-accumulate on the one-dimensional feature vector and a current feature value of each of the second nodes separately, adopting an obtained multiply-accumulate value as the feature value separately corresponding to each of the second nodes, and adopting each of the second nodes as the first node, and returning to the step of performing multiply-accumulate on the one-dimensional feature vector and a current feature value of a first node in the three-dimensional systolic array model, and adopting an obtained multiply-accumulate value as the feature value of the first node, until calculation of feature values of all nodes in the three-dimensional systolic array model is completed.

3. The image recognition method based on the systolic array according to claim 2, wherein after the performing multiply-accumulate of a feature vector and a weight value on the one-dimensional feature vector in parallel by using the three-dimensional systolic array model, to obtain a feature value corresponding to each node, the method further comprises:
  judging whether a number of currently obtained feature values reaches an output number corresponding to the image feature information;
  in response to the number of currently obtained feature values not reaching the output number corresponding to the image feature information, adopting a next weight value adjacent to a current weight value in the weight group of each node in the three-dimensional systolic array model as a latest current weight value of each node, and returning to the step of performing multiply-accumulate on the one-dimensional feature vector and a current feature value of a first node in the three-dimensional systolic array model, and adopting an obtained multiply-accumulate value as the feature value of the first node; and
  wherein the determining an article category contained in the image according to the feature value corresponding to each node and a pre-established corresponding relationship between the feature value and the article category is executed in response to the number of currently obtained feature values reaching the output number corresponding to the image feature information.

4. The image recognition method based on the systolic array according to claim 1, wherein the determining an article category contained in the image according to the feature value corresponding to each node and a pre-established corresponding relationship between the feature value and the article category comprises:
  calculating a cumulative sum value of feature values of all nodes according to the feature value corresponding to each node;
  calculating a ratio of the feature value corresponding to each node to the cumulative sum value, and selecting a node with the ratio satisfying a preset condition as a target node; and
  querying the pre-established corresponding relationship between the feature value and the article category, to determine the article category that matches the feature value of the target node.

5. The image recognition method based on the systolic array according to claim 4, wherein the selecting a node with the ratio satisfying a preset condition as a target node comprises:
  selecting a node with the largest ratio as the target node.

6. The image recognition method based on the systolic array according to claim 1, wherein before the allocating a corresponding weight group to each node in a trained three-dimensional systolic array model, the method further comprises:
  adjusting a number of channels of the three-dimensional systolic array model according to an output number corresponding to the image feature information.

7. The image recognition method based on the systolic array according to claim 2, wherein before the allocating a corresponding weight group to each node in a trained three-dimensional systolic array model, the method further comprises:
  adjusting a number of channels of the three-dimensional systolic array model according to an output number corresponding to the image feature information.

8. The image recognition method based on the systolic array according to claim 3, wherein before the allocating a corresponding weight group to each node in a trained three-dimensional systolic array model, the method further comprises:
  adjusting a number of channels of the three-dimensional systolic array model according to an output number corresponding to the image feature information.

9. An image recognition apparatus based on a systolic array, comprising:
  a memory storing a computer program; and
  a processor, configured to execute the computer program, and upon execution of the computer program, is configured to:
  convert obtained image feature information into a one-dimensional feature vector;
  convert an obtained weight matrix into a one-dimensional weight vector, and allocate a corresponding weight group to each node in a trained three-dimensional systolic array model;
  perform multiply-accumulate of a feature vector and a weight value on the one-dimensional feature vector in parallel by using the three-dimensional systolic array model, to obtain a feature value corresponding to each node; and
  determine an article category contained in the image according to the feature value corresponding to each node and a pre-established corresponding relationship between the feature value and the article category.

10. The image recognition apparatus according to claim 9, wherein in order to perform the multiply-accumulate of a feature vector and a weight value on the one-dimensional feature vector in parallel by using the three-dimensional systolic array model, to obtain a feature value corresponding to each node, the processor, upon execution of the computer program, is configured to:
  perform multiply-accumulate on the one-dimensional feature vector and a current feature value of a first node in the three-dimensional systolic array model, and adopt an obtained multiply-accumulate value as the feature value of the first node;
  transmit, according to a node transmission direction of the three-dimensional systolic array model, the one-dimensional feature vector respectively to at least three second nodes that are directly connected to the first node; and
  perform multiply-accumulate on the one-dimensional feature vector and a current feature value of each of the second nodes separately, adopt an obtained multiply-accumulate value as the feature value separately corresponding to each of the second nodes, and adopt each of the second nodes as the first node, and return to performance of the multiply-accumulate on the one-dimensional feature vector and the current feature value of the first node in the three-dimensional systolic array model, and adoption of the obtained multiply-accumulate value as the feature value of the first node, until calculation of feature values of all nodes in the three-dimensional systolic array model is completed.

11. The image recognition apparatus according to claim 10, wherein after the performance of the multiply-accumulate of a feature vector and a weight value on the one-dimensional feature vector in parallel by using the three-dimensional systolic array model, to obtain a feature value corresponding to each node, the processor, upon execution of the computer program, is further configured to:
  judge whether a number of currently obtained feature values reaches an output number corresponding to the image feature information;
  in response to the number of currently obtained feature values not reaching the output number corresponding to the image feature information, adopt a next weight value adjacent to a current weight value in the weight group of each node in the three-dimensional systolic array model as a latest current weight value of each node, and return to the performance of the multiply-accumulate on the one-dimensional feature vector and a current feature value of a first node in the three-dimensional systolic array model, and adoption of the obtained multiply-accumulate value as the feature value of the first node; and
  wherein the determination of the article category contained in the image according to the feature value corresponding to each node and a pre-established corresponding relationship between the feature value and the article category is in response to the number of currently obtained feature values reaching the output number corresponding to the image feature information.

12. The image recognition apparatus according to claim 9, wherein in order to determine an article category contained in the image according to the feature value corresponding to each node and a pre-established corresponding relationship between the feature value and the article category, the processor, upon execution of the computer program, is configured to:
  calculate a cumulative sum value of feature values of all nodes according to the feature value corresponding to each node;
  calculate a ratio of the feature value corresponding to each node to the cumulative sum value, and select a node with the ratio satisfying a preset condition as a target node; and
  query the pre-established corresponding relationship between the feature value and the article category, to determine the article category that matches the feature value of the target node.

13. The image recognition apparatus according to claim 12, wherein in order to select a node with the ratio satisfying a preset condition as a target node, the processor, upon execution of the computer program, is configured to:
  select a node with the largest ratio as the target node.

14. The image recognition apparatus according to claim 9, wherein before the allocation of a corresponding weight group to each node in a trained three-dimensional systolic array model, the processor, upon execution of the computer program, is configured to:
  adjust a number of channels of the three-dimensional systolic array model according to an output number corresponding to the image feature information.

15. A non-transitory computer-readable storage medium, storing a computer program that is executable by a processor, and upon execution by the processor, the computer program is configured to cause the processor to:
  convert obtained image feature information into a one-dimensional feature vector;
  convert an obtained weight matrix into a one-dimensional weight vector, and allocate a corresponding weight group to each node in a trained three-dimensional systolic array model;
  perform multiply-accumulate of a feature vector and a weight value on the one-dimensional feature vector in parallel by using the three-dimensional systolic array model, to obtain a feature value corresponding to each node; and
  determine an article category contained in the image according to the feature value corresponding to each node and a pre-established corresponding relationship between the feature value and the article category.

16. The non-transitory computer-readable storage medium according to claim 15, wherein in order to perform the multiply-accumulate of a feature vector and a weight value on the one-dimensional feature vector in parallel by using the three-dimensional systolic array model, to obtain a feature value corresponding to each node, the computer program, upon execution by the processor, is configured to cause the processor to:
  perform multiply-accumulate on the one-dimensional feature vector and a current feature value of a first node in the three-dimensional systolic array model, and adopt an obtained multiply-accumulate value as the feature value of the first node;
  transmit, according to a node transmission direction of the three-dimensional systolic array model, the one-dimensional feature vector respectively to at least three second nodes that are directly connected to the first node; and
  perform multiply-accumulate on the one-dimensional feature vector and a current feature value of each of the second nodes separately, adopt an obtained multiply-accumulate value as the feature value separately corresponding to each of the second nodes, adopt each of the second nodes as the first node, and return to the performance of the multiply-accumulate on the one-dimensional feature vector and a current feature value of a first node in the three-dimensional systolic array model, and the adoption of an obtained multiply-accumulate value as the feature value of the first node, until calculation of feature values of all nodes in the three-dimensional systolic array model is completed.

17. The non-transitory computer-readable storage medium according to claim 16, wherein after the performance of the multiply-accumulate of a feature vector and a weight value on the one-dimensional feature vector in parallel by using the three-dimensional systolic array model, to obtain a feature value corresponding to each node, the computer program, upon execution by the processor, is configured to cause the processor to:
  judge whether a number of currently obtained feature values reaches an output number corresponding to the image feature information;
  in response to the number of currently obtained feature values not reaching the output number corresponding to the image feature information, adopt a next weight value adjacent to a current weight value in the weight group of each node in the three-dimensional systolic array model as a latest current weight value of each node, and return to performance of the multiply-accumulate on the one-dimensional feature vector and a current feature value of a first node in the three-dimensional systolic array model, and adoption of an obtained multiply-accumulate value as the feature value of the first node; and wherein the determination of an article category contained in the image according to the feature value corresponding to each node and a pre-established corresponding relationship between the feature value and the article category is in response to the number of currently obtained feature values reaching the output number corresponding to the image feature information.

18. The non-transitory computer-readable storage medium according to claim 15, wherein in order to determine an article category contained in the image according to the feature value corresponding to each node and a pre-established corresponding relationship between the feature value and the article category, the computer program, upon execution by the processor, is configured to cause the processor to:

calculate a cumulative sum value of feature values of all nodes according to the feature value corresponding to each node;

calculate a ratio of the feature value corresponding to each node to the cumulative sum value, and select a node with the ratio satisfying a preset condition as a target node; and query the pre-established corresponding relationship between the feature value and the article category, to determine the article category that matches the feature value of the target node.

19. The non-transitory computer-readable storage medium according to claim 18, wherein in order to select a node with the ratio satisfying a preset condition as a target node, the computer program, upon execution by the processor, is configured to cause the processor to:

select a node with the largest ratio as the target node.

20. The non-transitory computer-readable storage medium according to claim 15, wherein before the allocation of a corresponding weight group to each node in a trained three-dimensional systolic array model, the computer program, upon execution by the processor, is configured to cause the processor to:

adjust a number of channels of the three-dimensional systolic array model according to an output number corresponding to the image feature information.

* * * * *